United States Patent [19]
Schwanda

[11] Patent Number: 5,767,586
[45] Date of Patent: Jun. 16, 1998

[54] TUBULAR TURBINE PLANT HAVING A COMBINED SUPPORTING AND GUIDE BEARING

[75] Inventor: Josef Schwanda, Lupfig, Switzerland

[73] Assignee: Asea Brown Boveri AG, Baden, Switzerland

[21] Appl. No.: 683,650

[22] Filed: Jul. 15, 1996

[30] Foreign Application Priority Data

Jul. 15, 1995 [DE] Germany .................. 195 25 830.4

[51] Int. Cl.⁶ .................. F03B 13/00; H02P 9/04
[52] U.S. Cl. .................. 290/54; 290/52; 384/99; 384/100; 384/322
[58] Field of Search .................. 290/52, 54; 384/99, 384/100, 322, 397; 415/132, 112; 60/39

[56] References Cited

U.S. PATENT DOCUMENTS

| | | | |
|---|---|---|---|
| 2,524,693 | 10/1950 | Bryant | 308/26 |
| 4,086,759 | 5/1978 | Karstensen et al. | 60/39.08 |
| 4,331,366 | 5/1982 | Domer et al. | 308/22 |
| 4,388,004 | 6/1983 | Bellati | 384/397 |
| 4,764,034 | 8/1988 | Fust et al. | 384/100 |
| 5,261,750 | 11/1993 | Eckhardt et al. | 384/455 |
| 5,382,099 | 1/1995 | Bauer et al. | 384/454 |
| 5,395,172 | 3/1995 | Grabscheid | 385/557 |

FOREIGN PATENT DOCUMENTS

| | | |
|---|---|---|
| 369417 A1 | 11/1989 | European Pat. Off. . |
| 884889 | 7/1949 | Germany . |
| 6601132 | 3/1969 | Germany . |
| 9014523 A1 | 11/1990 | WIPO . |

OTHER PUBLICATIONS

Brown Boveri Mitteilungen, Apr. 1970, vol. 57, pp. 151, 182–190 (in particular Figure 5 on p. 186) (discussed in the specification).

Primary Examiner—Steven L. Stephan
Assistant Examiner—Elvin G. Enad
Attorney, Agent, or Firm—Oblon, Spivak, McClelland, Maier & Neustadt, P.C.

[57] ABSTRACT

A combined supporting and guide bearing for a tubular turbine plant has an axial guide bearing with two bearing supporting surfaces in an annular groove of the shaft. The bearing segments are each fastened to the radially inner section of a common supporting beam which is detachably fastened to the bearing support and extends into the annular groove.

8 Claims, 4 Drawing Sheets

TUBULAR TURBINE PLANT HAVING A COMBINED SUPPORTING AND GUIDE BEARING

BACKGROUND OF THE INVENTION

1. Field of the Invention

The invention relates in general to a tubular turbine plant, comprising a generator, enclosed by a housing, and a water turbine, which are either arranged on a common shaft or their shaft ends are connected to one another via a coupling, a combined supporting and guide bearing being provided in the shaft section between generator and turbine. It relates in particular to a combined supporting and guide bearing for these machines, in which the combined supporting and guide bearing is held by a bearing support surrounding it, to which bearing support first bearing segments are fastened, which interact with a first cylindrical shaft section as a radial bearing-supporting surface, and to which bearing support two groups of second bearing segments are fastened, which interact with two axially distanced, radially directed shaft sections as axial bearing-supporting surfaces, and means are provided for adjusting the mutual position of the bearing segments with regard to the said shaft sections.

The invention in this case is based generally on a prior art as disclosed, for example, by company publication Brown Boveri Mitteilungen April 1 1970, volume 57, pp. 182–190, in particular FIG. 5 on page 186. A construction of the combined supporting and guide bearing for machines of this type which goes into more detail is the subject matter of WO 90/14523.

2. Discussion of Background

In tubular generators, also called tubular turbine generators, the combined supporting and guide bearing arranged between turbine and generator must absorb not only the dead weight of the rotating parts but also the hydraulic thrust amounting to many hundreds of tonnes. This combined bearing is held be a bearing support surrounding it. Fastened to the bearing support are axial bearing segments which interact with two radially directed supporting surfaces on a shaft collar as axial bearing-supporting surfaces. Furthermore, radial bearing segments which interact with the cylindrical shaft section of the said collar as a radial bearing-supporting surface are fastened to the bearing support. Furthermore, means of adjusting the mutual position of the bearing segments with regard to the said axial and radial bearing-supporting surfaces on the shaft sections are allocated to all segments (cf. WO 90/14523).

In this arrangement, the supporting of the axial bearing segments on the bearing support is of a very complicated design, since the bearing support has to enclose the said collar in a U-shape in the widest sense. During adjusting and inspection work, complicated casing parts have to be removed in order to reach the bearing adjusting elements.

SUMMARY OF THE INVENTION

Accordingly, one object of the invention is to provide a novel tubular turbine plant having a combined supporting and guide bearing which withstands all stresses and is of simple construction and in which the bearing segments together with their adjusting elements are readily accessible.

This object is achieved according to the invention if an annular groove having bearing-supporting surfaces running orthogonally to the shaft axis is formed in the shaft section between turbine and generator, and if the second bearing segments are each fastened to the radially inner section of a common supporting beam which is detachably fastened to the bearing support and enters into the said annular groove.

The advantages of the invention may be seen in particular in the fact that:

- assembly and disassembly of the bearing segments is simple to carry out;
- both the radial and axial bearing segments are readily accessible and can be adjusted individually;
- service and inspection work can be carried out quickly;
- the bearings are free of oil during stoppage of the machine;
- the axial-bearing elasticity can be matched in a simple manner to the overall elasticity of the tubular generator due to the design and configuration of the supporting beams.

An exemplary embodiment of the invention as well as further advantages achievable by it are explained in more detail below with reference to the drawing.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
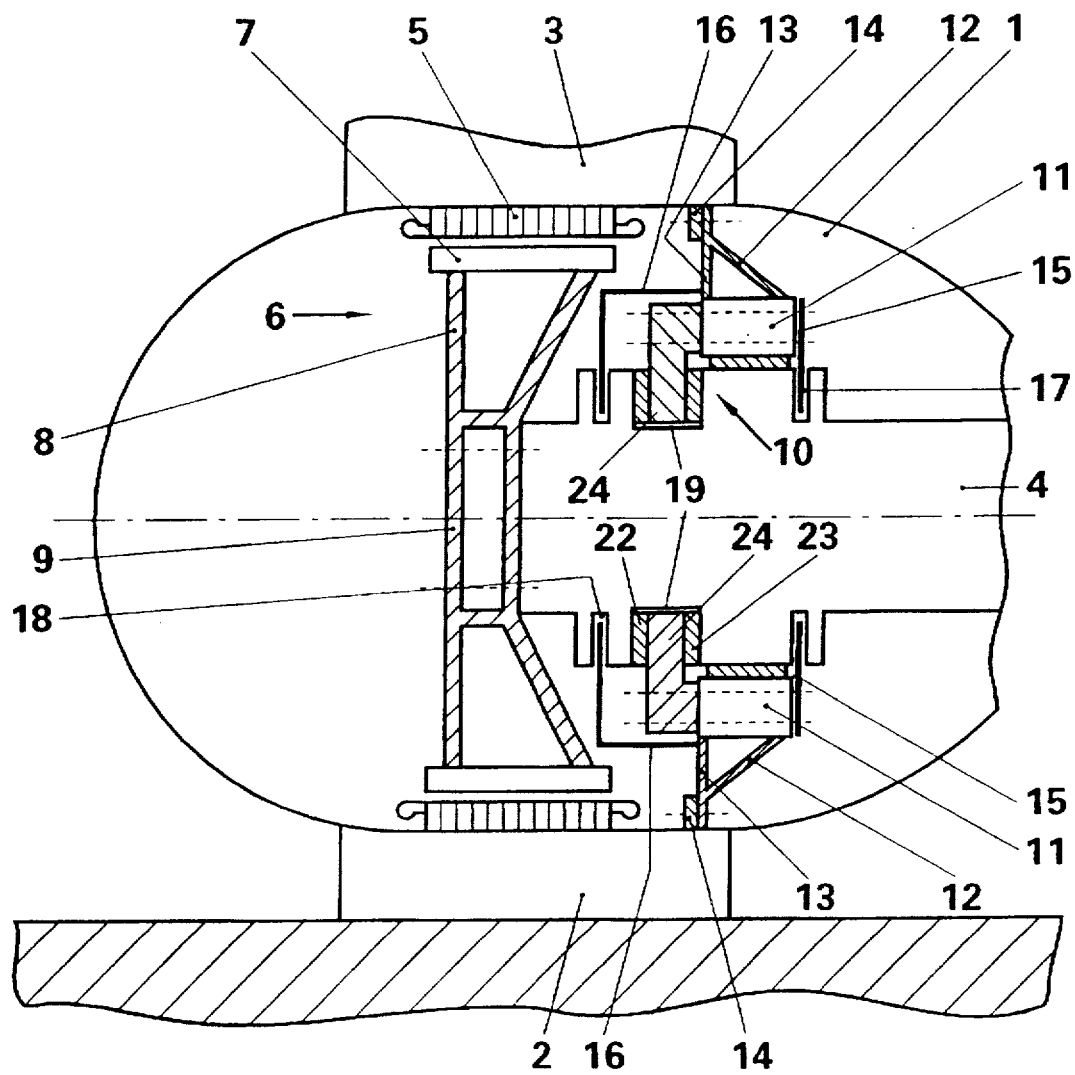
FIG. 1 shows a greatly simplified longitudinal section through a tubular turbine plant.

Referring now to the drawings, wherein like reference numerals designate identical or corresponding parts throughout the several views, in the highly schematic representation of a tubular turbine plant according to FIG. 1 a generator together with auxiliary equipment, which generator is coupled to a water turbine (not shown), is arranged in a tear-shaped capsule 1 which is held under water by means of a bottom stay 2 and a top stay 3. In the example, the turbine and generator are arranged on the same shaft 4. The generator is arranged in an overhung position on the shaft 4 and comprises a stator 5 and a rotor 6. The latter has a rotor body 7 with rotor poles (not shown) which is fastened on a rotor-supporting structure 8. The latter is releasably fastened in the hub area 9 to the front end of the shaft 4. The turbine wheel is arranged at the other end of the shaft 4.

The combined supporting and guide bearing generally identified by the reference numeral 10 sits in the shaft section between generator and turbine and is supported by a bearing support 11 which is held on a flange 14 on the inner wall of the capsule 1 via a conical fastening part 12 and a fastening part 13 arranged radially in the example. The bearing is completely surrounded by a multi-piece bearing casing 15, 16 which enters like a radial gap seal at the shaft-side end into grooves 17, 18 in the shaft.

In this respect, tubular turbine plants are already known and are described and shown, for example, in the publication cited at the beginning, Brown Boveri Mitteilungen loc. cit.

As is readily apparent from FIG. 5 of Brown Boveri Mitteilungen or else from the single figure of WO 90/14523, the accessibility of the bearing segments for the purpose of adjusting or service work is impeded not only by the bearing casings but also by the components of the bearing support. This applies in particular to combined supporting and guide bearings according to WO/14523, that is constructions in which the axial bearing segments interact with the two side surfaces of the shaft collar.

Figure 3:
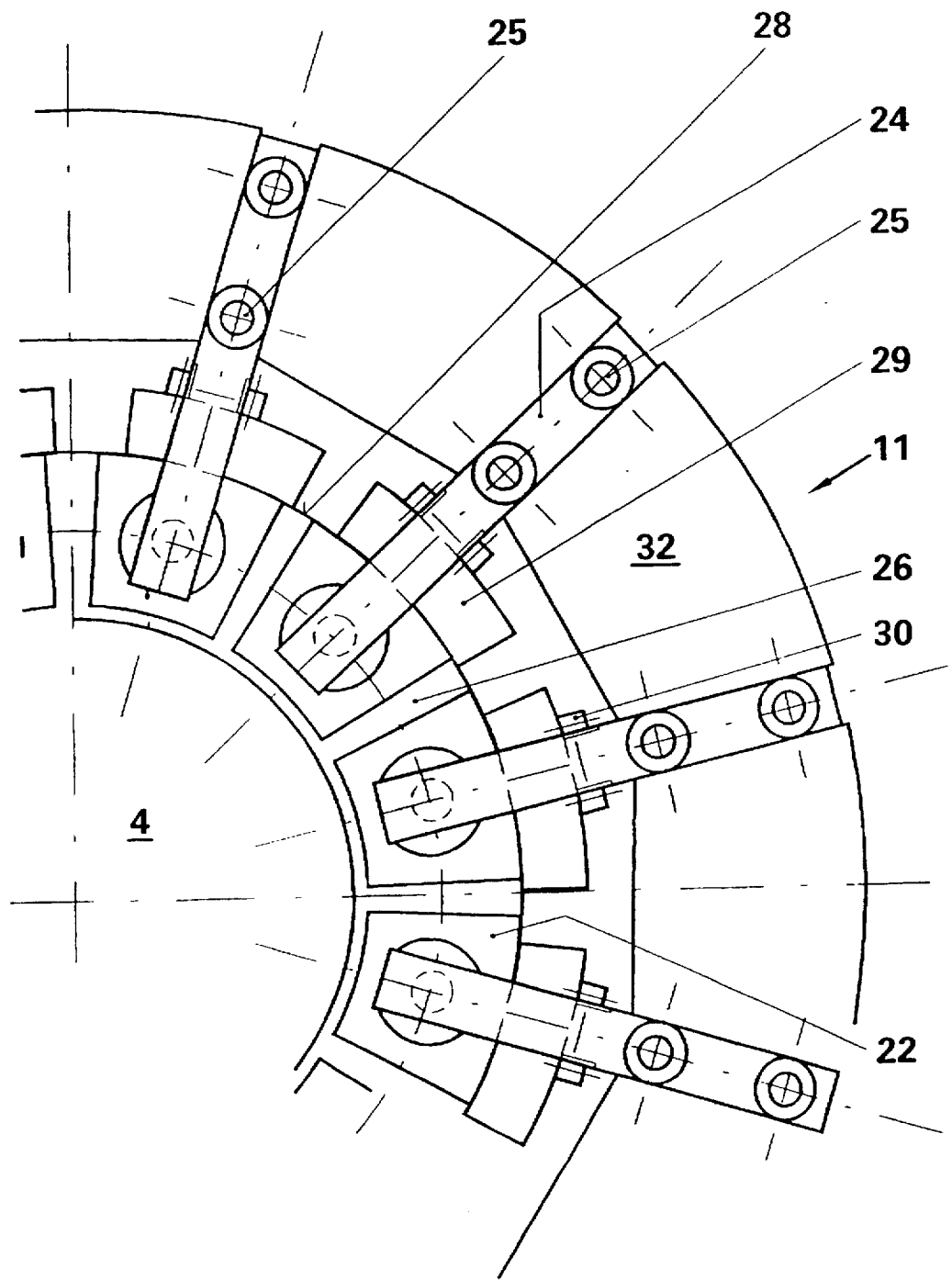
FIG. 3 shows a cross section through part of the radial guide bearing of the generator according to FIG. 2 along line AA in FIG. 2.

Thus, in order to provide a tubular turbine plant having a combined supporting and guide bearing which withstands all stresses and has a simple construction and in which the bearing segments together with their adjusting elements are readily accessible, provision is made according to the invention to form an annular groove 19 having bearing-supporting surfaces 20, 21 running orthogonally to the shaft axis in the shaft section between turbine and generator. The bearing segments 22, 23 allocated to these two bearing-supporting surfaces 20, 21 are fastened to the inner end of a radially oriented supporting beam 24. The supporting beams—there are 12 in the example—are uniformly distributed over the periphery (cf. FIG. 3). The supporting beams 24 are detachably fastened to the bearing support 11 by means of screw bolts 25, passing axially completely through the bearing support 11, and enter together with the segments 22, 23 fastened to them into the said annular groove 19. In the example, the arrangement is made in such a way that the fastening surface 26 on the bearing support 11, which fastening surface 26 runs orthogonally to the axis of the shaft 4, lies at the same axial level as the bearing-supporting surface 20 on the side wall of the groove 19. In this way, the supporting beam together with segments 22, 23 can be pulled radially outward and removed after slackening and removing the screw bolts 25.

Figure 2:
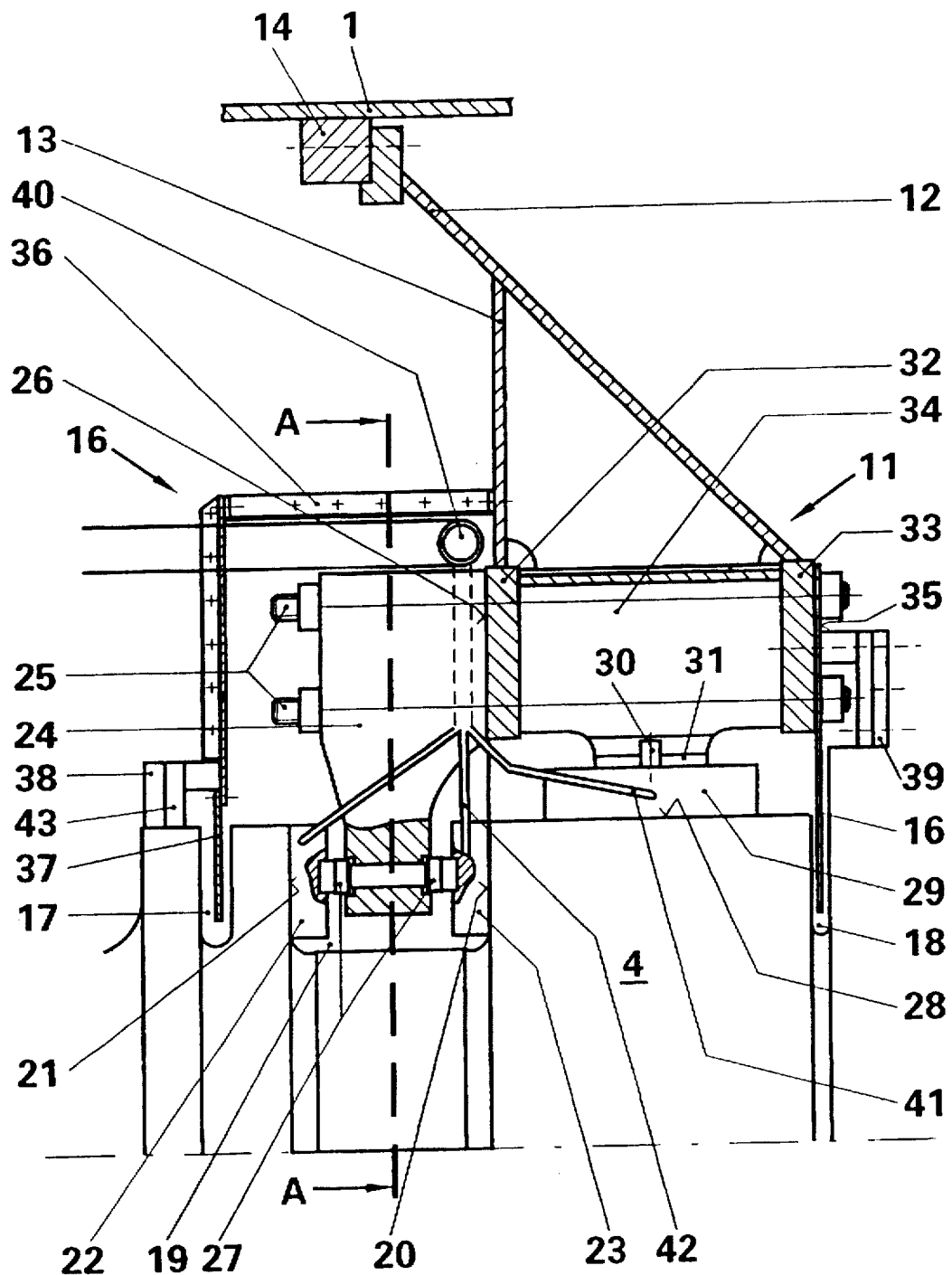
FIG. 2 shows a longitudinal section, going into more detail, through the supporting and guide bearing of the generator according to FIG. 1.
Figure 4:
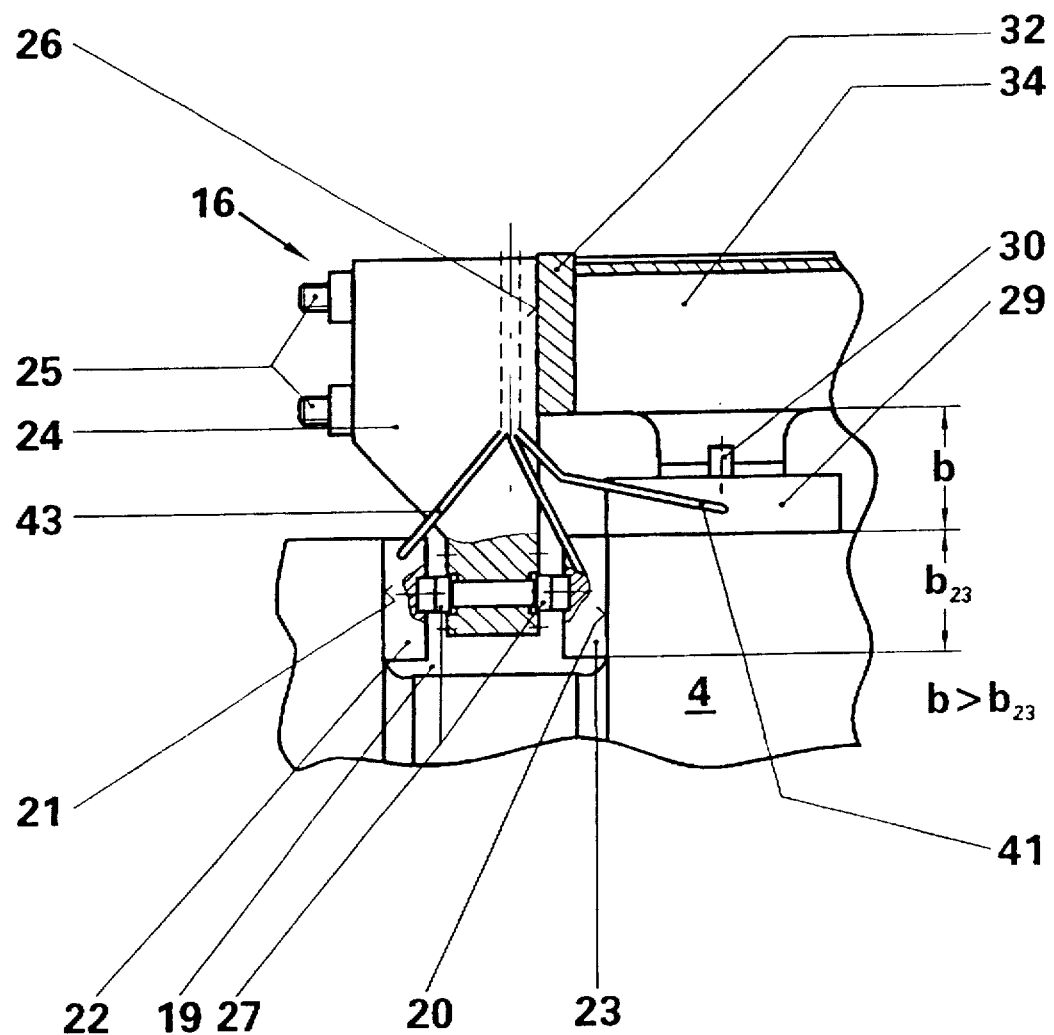
FIG. 4 shows a longitudinal section through part of an alternative supporting and guide bearing.

If the fastening surface 26 on the bearing support 11, which fastening surface 26 runs orthogonally to the axis of the shaft 4, does not lie at the same axial level as the bearing-supporting surface 20 on the side wall of the groove 19—this embodiment is shown in FIG. 4 by way of example, the same parts being provided with the same reference numerals as in FIG. 2—provision is to be made for the radial width $b_{23}$ of the segments 23 to be smaller than the clearance width b between the individual ring 32 and the shaft 4. If this condition is met, after slackening and removal of the screw bolts 25, the supporting beam together with segments 22, 23 can be pulled first of all radially outward and then in the axial direction and can thus be removed.

The bearing segments 22, 23 are detachably fastened to the supporting beam in a known manner by means of first axially acting adjusting means 27 and are readily accessible from the outside. The supporting surface 28 of the radial supporting-bearing segments 29 on the shaft 4 directly adjoin the annular groove 19. The radial supporting-bearing segments 29 are detachably fastened to the inner periphery of the bearing support 11 via second radially acting adjusting means 30 and, if need be, distance plates 31.

The bearing support 11 itself comprises (in the final state) a double ring having two individual rings 32, 33 which are axially distanced from one another and are welded to one another via radially directed, axially running webs 34. So that the clamping forces for the supporting beams 24 do not act on the welds, the construction is made in such a way that the bores pass axially through the webs 34 and each individual ring 32, 33 comprises a multiplicity of ring segments which are each butt-welded to the ends of the webs 34. In this arrangement, the axially running narrow sides, pointing inward, of the webs serve at the same time to guide and fasten the radial supporting-bearing segments 29.

The bearing casing at the turbine-side end of the supporting and guide bearing is made with a plate 16 which comprises two or more ring parts, enters into the groove 18 and is screwed to the turbine-side end face 35 of the bearing support 11. The bearing casing at the generator-side end is made by a two-piece or multi-piece box-like cover 36 of L-shaped cross section which is detachably fastened to the radial fastening part 13. In a similar way to the turbine-side end, a two-piece or multi-piece ring plate 37 entering into the groove 17 is detachably fastened to the leg pointing radially inward. The bearing is actually sealed off from the turbine and generator space in a known manner by contact seals 38 and 39 which are detachably fastened on the outside to the cover 36 and the ring 33 respectively.

For the sake of completeness, the oil supply of the bearing 10 is also shown in FIG. 2. This oil supply comprises a ring line 40 which runs inside the cover 36 and from which tap lines 41, 42, 43 branch off inwardly to the segments 29, 22 and 23 respectively.

As is readily evident from FIG. 2, the construction of the combined supporting and guide bearing 10 described permits problem-free access to the essential bearing parts after removal of the cover 36. Both the radial and the axial supporting segments are not only easy to inspect and adjust, they can also be removed with effortless ease. The reason for this is that, after removal of the supporting beams 24, the segments 29 of the radial bearing can also simply be displaced in the direction of the annular groove 19 and removed from the annular space between shaft 4 and bearing support 11.

A further advantage of the arrangement described is that the axial guide and radial mounting can be implemented in a very compact manner without complicated supporting and holding devices, since they are fastened to a common holding member, the bearing support 11. Furthermore, the use of a single holding member (supporting beam 24) for each two segments 22, 23, through suitable dimensioning of the supporting beam, e.g. over its cross section, allows defined rigidity or else elasticity to be introduced into the axial mounting, which in addition may also be changed subsequently if necessary, e.g. by exchanging for other supporting beams.

The bearing construction has been described with reference to a tubular turbine plant in which the generator and the turbine are arranged on a common shaft 4 and in which the generator rotor is mounted in an overhung position. It may of course also be used in plants having generators mounted on both sides or even in plants in which the generator and the turbine are used via an intermediate shaft, as is the case, for example, in FIG. 5 on page 186, Brown Boveri Mitteilungen loc. cit.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A tubular turbine plant, comprising;
 a generator, enclosed by a housing or a capsule, and a water turbine, which are either arranged on a common shaft or their shaft ends are connected to one another via a coupling;
 a combined supporting and guide bearing being provided in a shaft section between generator and turbine, said combined supporting and guide bearing being held by a bearing support surrounding it;

first bearing segments being fastened to said bearing support, said first bearing segments interacting with a first cylindrical shaft section as a radial bearing-supporting surface; and two groups of second bearing segments being fastened to said bearing support, said second bearing segments interacting with two axially distanced, radially directed shaft sections as axial bearing-supporting surfaces, and means being provided for adjusting the mutual position of the bearing segments with regard to the shaft sections, wherein an annular groove having bearing-supporting surfaces running orthogonally to the shaft axis is formed in the shaft section between turbine and generator, and wherein the second bearing segments are each fastened to the radially inner section of a common supporting beam which is detachably fastened to the bearing support and extends into the annular groove;

wherein the bearing support comprises two axially distanced individual rings which are distanced by means of radially directed, axially running webs and are firmly connected to the latter; and wherein the supporting beams are fastened to the bearing support by means of screw bolts which pass axially through the entire bearing support.

2. The tubular turbine plant as claimed in claim 1, wherein the first bearing segments are detachably fastened to the end faces of the webs with adjusting means in between.

3. The tubular turbine plant as claimed in claim 1, wherein the fastening surface on the bearing support, runs orthogonally to the axis of the shaft and lies at the same axial level as the bearing-supporting surface on the side wall of the groove.

4. The tubular turbine plant as claimed in claim 1, wherein, when the fastening surface on the bearing support and the bearing-supporting surface on the side wall of the groove lie at different axial levels, a clearance width between shaft and bearing support is greater than a radial width of the segment adjacent to the bearing support.

5. A tubular turbine plant, comprising;

a generator, enclosed by a housing or a capsule, and a water turbine, which are either arranged on a common shaft or their shaft ends are connected to one another via a coupling;

a combined supporting and guide bearing being provided in a shaft section between generator and turbine, said combined supporting and guide bearing being held by a bearing support surrounding it;

first bearing segments being fastened to said bearing support, said first bearing segments interacting with a first cylindrical shaft section as a radial bearing-supporting surface; and two groups of second bearing segments being fastened to said bearing support, said second bearing segments interacting with two axially distanced, radially directed shaft sections as axial bearing-supporting surfaces, and means being provided for adjusting the mutual position of the bearing segments with regard to the shaft sections, wherein an annular groove having bearing-supporting surfaces running orthogonally to the shaft axis is formed in the shaft section between turbine and generator, and wherein the second bearing segments are each fastened to the radially inner section of a common supporting beam which is detachably fastened to the bearing support and extends into the annular groove;

wherein the bearing support comprises radially directed, axially running webs, wherein ring segments running in the peripheral direction are butt-welded to the two ends of the webs and webs and ring segments form a double-ring-like bearing support, and wherein the supporting beams are detachably fastened to the bearing support by means of screw bolts which pass axially through the webs.

6. The tubular turbine plant as claimed in claim 5, wherein the first bearing segments are detachably fastened to the end faces of the webs with adjusting means in between.

7. The tubular turbine plant as claimed in claim 5, wherein the fastening surface on the bearing support runs orthogonally to the axis of the shaft and lies at the same axial level as the bearing-supporting surface on the side wall of the groove.

8. The tubular turbine plant as claimed in claim 5, wherein, when the fastening surface on the bearing support the one hand and the bearing-supporting surface on the side wall of the groove on lie at different axial levels, a clearance width between shaft and bearing support is greater than the radial width of the segment adjacent to a bearing support.

* * * * *